(12) United States Patent
Yoon et al.

(10) Patent No.: US 6,838,521 B2
(45) Date of Patent: Jan. 4, 2005

(54) DISPERSANT COMPOSITION USED FOR PREPARING AQUEOUS PIGMENTED INK FOR INK-JET

(75) Inventors: Chun Yoon, Seoul (KR); Bon-Chul Koo, Seoul (KR)

(73) Assignee: Sejong University (KR)

( * ) Notice: Subject to any disclaimer, the term of this patent is extended or adjusted under 35 U.S.C. 154(b) by 237 days.

(21) Appl. No.: 10/200,894

(22) Filed: Jul. 22, 2002

(65) Prior Publication Data

US 2003/0051632 A1 Mar. 20, 2003

(30) Foreign Application Priority Data

Jul. 21, 2001 (KR) .................................. 10-2001-43973

(51) Int. Cl.$^7$ .......................... C08L 25/02; C08L 33/02; C08L 35/00; C08L 39/04
(52) U.S. Cl. ....................... 525/203; 525/207; 525/221; 525/241
(58) Field of Search ................................ 525/203, 207, 525/221, 241

(56) References Cited

U.S. PATENT DOCUMENTS

| | | | | |
|---|---|---|---|---|
| 5,886,065 A | * | 3/1999 | Tsang et al. | 523/161 |
| 5,954,866 A | * | 9/1999 | Ohta et al. | 106/31.89 |
| 6,241,811 B1 | * | 6/2001 | Sano | 106/31.85 |

* cited by examiner

*Primary Examiner*—Nathan M. Nutter
(74) *Attorney, Agent, or Firm*—Peter F. Corless; Christine C. O'Day; Edwards & Angell, LLP

(57) ABSTRACT

The present invention relates to a new dispersant composition used for preparing ink for ink-jet, which provides long term fluidity at a fine injection nozzle of ink-jet, shows a stable injection amount, and gives no coagulation of pigment particles when ink for ink-jet is applied.

10 Claims, No Drawings

DISPERSANT COMPOSITION USED FOR PREPARING AQUEOUS PIGMENTED INK FOR INK-JET

TECHNICAL FIELD

The present invention relates to a dispersant composition used for preparing aqueous pigmented ink for ink-jet. Specifically, the present invention relates to a new dispersant composition used for preparing ink for ink-jet, which provides long term fluidity at a fine injection nozzle of ink-jet, shows a stable injection amount, and gives no coagulation of pigment particles when ink for ink-jet is applied.

BACKGROUND ART

Dupont Co. filed a patent application concerning pigmented ink for ink-jet (U.S. Pat. No. 5,519,085). In this patent, trimethylsilyl metacrylate, 2-phenylethyl metacrylate and ethoxytriethyleneglycol metacrylate were added dropwise to a tetrahydrofuran solution wherein 1-methoxy-1-trimethylsiloxy-2-methyl-1-propene and tetrabutylammoniumbiacetate are dissolved together to synthesize poly (metacrylic acid-co-2-phenylethyl metacrylate-co-ethoxytriethyleneglycol metacrylate) as the desired polymeric triblock copolymer, which is then dissolved in an aqueous potassium hydroxide solution to give a dispersant solution. Further, this dispersant solution and the corresponding pigment may be dispersed under high pressure to provide a stable dispersant solution, to which a variety of additives may be added to prepare ink for ink-jet.

However, the process described in the above patent is very complicated and also has a disadvantage that cost competitiveness is not good because the expensive raw materials are used for preparing ink for ink-jet.

DISCLOSURE OF INVENTION

Thus, the present inventors have extensively studied to improve the disadvantages occurring in prior art. As a result, the inventors have developed a dispersant composition from which good particle stability, stable injection amount, and high quality of printing can be achieved, with using inexpensive starting materials and a simple process, and then completed the present invention.

According to the present invention, there is no need to use the expensive raw materials described in U.S. Pat. No. 5,519,085, and to use the expensive special reactor for preparing the triblock copolymer dispersant that requires well-controlled and specific reaction conditions. Any conventional starting materials and reactors can be used for preparing a high functional dispersant that provides superior pigment dispersion efficiency and stability, and so is very suitable as an ink dispersant for ink-jet.

Therefore, it is an object of the present invention to provide a dispersant composition for preparing ink for ink-jet, which exhibits superior pigment dispersion efficiency and stability.

BEST MODE FOR CARRYING OUT THE INVENTION

The dispersant composition of the present invention that is used for preparing pigmented ink for ink-jet comprises a random-type polymer compound of the following formula (1):

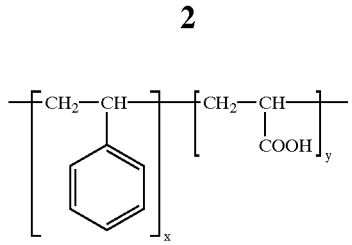

wherein x and y independently of one another are numbers making the average molecular weight of the compound of formula (1) a range of 1000 to 100000, and a random type polymer compound of the following formula (2):

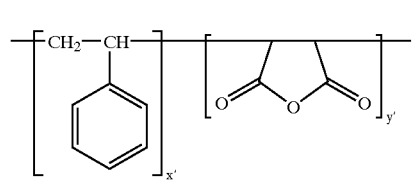

wherein x' and y' independently of one another are numbers making the average molecular weight of the compound of formula (2) a range of 1500 to 150000.

The ratio of x and y or x' and y' in the above compounds of formulae (1) and (2) generally shows that y or y' ranges from 0.1 to 3 when x or x' is 1.

The dispersant composition of the present invention can also optionally comprise a polymer compound of the following formula (3):

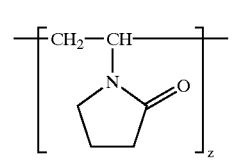

wherein z is a number making the average molecular weight of the compound of formula (3) a range of 5000 to 500000 (that is, z is from 45 to 4500).

The dispersant composition according to the present invention may comprise 0.5 to 95% by weight of the random type polymer compound of formula (1), 5 to 99.5% by weight of the random type polymer compound of formula (2), and 0 to 50% by weight of the polymer compound of formula (3), preferably 10 to 70% by weight of the polymer compound of formula (1), 15 to 85% by weight of the polymer compound of formula (2), and 0.5 to 20% by weight of the polymer compound of formula (3). The preferable average molecular weight of each polymer compound is from 3000 to 50000 in case of the compound of formula (1), from 3000 to 25000 in case of that of formula (2), and from 10000 to 150000 in case of that of formula (3).

The dispersant composition of the present invention may be used in the form of a mixture of the compounds of formulae (1) and (2), and optionally the compound of formula (3). However, the desired purpose can be more effectively achieved when using a dispersant composition obtained by heating said mixture at 70 to 110° C., preferably around 100° C. in the presence of a hydroxide for 1 to 24 hours. As the preferable hydroxide that can be used herein, one or more selected from a group consisting of lithium hydroxide, sodium hydroxide, potassium hydroxide and ammonium hydroxide can be mentioned. They are used in an amount of 0.05 to 0.9 g, preferably 0.2 to 0.65 g when the total amount of the polymer compounds introduced is 1 g. The dispersant composition obtained by the above mentioned process may additionally comprise one or more selected from a group consisting of the compounds of the following formulae (4), (5), and (6):

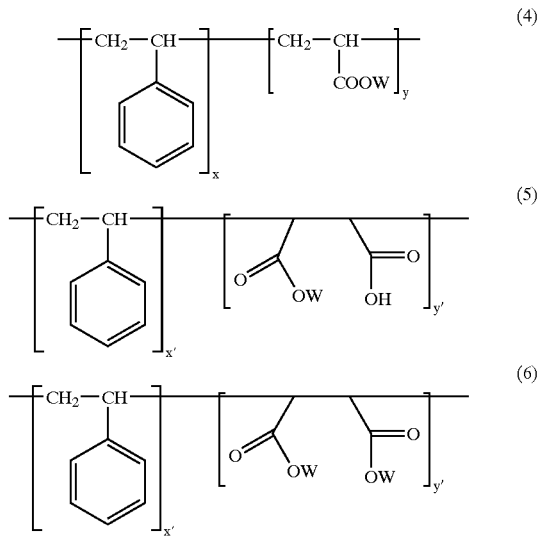

wherein x, y, x' and y' are defined as above, and W represents Li, Na, K, or $NH_4$, which have been formed through substitution and/or ring-opening reaction, in addition to the compounds of formulae (1), (2), and (3).

The dispersant composition prepared according to the present invention may be mixed with pigments, dispersed, and pulverized into particles of 100 to 300 nm of an average particle size by dinomill, sand mill, three roll mill, or microfludizer, to give a mill-base. Thus obtained mill-base is used for preparing aqueous pigmented ink for ink-jet. The ink is then measured to know its particle size (see the following Table 1). The particle size is measured by Coulter LS-230 by Beckman Coulter Co.

TABLE 1

Average Particle Size (In the case of using carbon black pigment)

| | Ink of Example 1 of the Present Invention |
|---|---|
| Particle Size | 92 nm |

As can be seen from the result of Table 1, the dispersant according to the present invention shows excellent dispersion force, and so can realize ink particles having a minute particle size. Further, as shown below, it has an additional advantage that dispersion stability of the particles is very good.

The stability of particles upon long term storage, one of the characteristics required for a dispersant, is determined by a method of measuring time lapse stability. The result is shown in the following Table 2. The time lapse stability is measured under accelerated conditions. That is, the sample is stored at 60° C. for 8 hours and at −15° C. for 8 hours, which is repeated four times. Then, the particle size is measured.

TABLE 2

Change of Particle Size (In the case of using carbon black pigment)

| | Ink of Example 1 of the Present Invention |
|---|---|
| Change of Particle Size | 92 nm → 103 nm |

As demonstrated from the above Table 2, the ink prepared by using the dispersant according to the present invention shows superior stability upon long term storage. Therefore, it is expected that excellent quality can be maintained even under a severe storage condition when the ink is marketed.

The present invention will be more specifically explained in the following examples. However, it should be understood that the following examples are intended to illustrate the present invention but not to limit the scope of the present invention in any manner.

EXAMPLE 1

20 g of poly(acrylic acid-co-styrene) of formula (1) (Average Molecular Weight 60000), 9g of poly(styrene-co-maleic anhydride) of formula (2) (Average Molecular Weight 1900), and 1 g of polyvinylpyrrolidone of formula (3) (Average Molecular Weight 5500) were introduced into 165 g of water and well mixed. 5 g of sodium hydroxide was slowly added thereto and the resulting mixture was stirred for 1 hour at room temperature. This mixture was stirred for 5 hours at 100° C. to give a dispersant solution that is transparent and has some viscosity.

20 g of the dispersant solution, 10 g of carbon black for pigment, and 70 g of water were pulverized in a dinomill for 8 hours at 4500 rpm using 1 mm Zirconia bead to give mill-base having an average particle size of 92 nm.

20 g of the mill-base was introduced into a reactor equipped with a stirring apparatus. 67 g of water, 5 g of glycerol, 2 g of cellosolve, 5 g of ethylene glycol, 1 g of 2-pyrrolidone, 0.1 g of cocobetaine, a surfactant, and 0.1 g of CA-650, an antifoaming agent, were added thereto in the order at room temperature and then stirred to give aqueous pigmented ink for ink-jet. The ink thus prepared was filtered through Whatman filter paper Nos. 1 and 4 to remove some insoluble components having a large particle size.

EXAMPLE 2

5 g of poly(acrylic acid-co-styrene) of formula (1) (Average Molecular Weight 40000), 14 g of poly(styrene-co-maleic anhydride) of formula (2) (Average Molecular Weight 1600), and 1 g of polyvinylpyrrolidone of formula (3) (Average Molecular Weight 25000) were introduced into 165 g of water and well mixed. 7.5 g of potassium hydroxide was slowly added thereto and the resulting mixture was stirred for 1 hour at room temperature. This mixture was stirred for 5 hours at 100° C. to give a dispersant solution that is transparent and has some viscosity.

20 g of the dispersant solution, 10 g of carbon black for pigment, and 70 g of water were pulverized in a dinomill for 8 hours at 4500 rpm using 1 mm Zirconia bead to give mill-base having an average particle size of 92nm.

20 g of the mill-base was introduced into a reactor equipped with a stirring apparatus. 67 g of water, 4 g of glycerol, 2 g of cellosolve, 5 g of ethylene glycol, 1 g of 2-pyrrolidone, 1 g of N-methylpyrrolidone, 0.1 g of cocobetaine, a surfactant, and 0.1 g of CA-650, an antifoaming agent, were added thereto in the order at room temperature and then stirred to give aqueous pigmented ink for ink-jet. The ink thus prepared was filtered through Whatman filter paper Nos. 1 and 4 to remove some insoluble components having a large particle size.

EXAMPLE 3

3 g of poly(acrylic acid-co-styrene) of formula (1) (Average Molecular Weight 10000), 16.5 g of poly(styrene-co-maleic anhydride) of formula (2) (Average Molecular Weight 1900), and 0.5 g of polyvinylpyrrolidone of formula (3) (Average Molecular Weight 5500) were introduced into 165 g of water and well mixed. 10 g of sodium hydroxide was slowly added thereto and the resulting mixture was stirred for 1 hour at room temperature. This mixture was stirred for 5 hours at 100° C. to give a dispersant solution that is transparent and has some viscosity.

20 g of the dispersant solution, 10 g of carbon black for pigment, and 70 g of water were pulverized in a microfludizer (pressure: 20000 psi) four times to give mill-base having an average particle size of 92 nm.

20 g of the mill-base was introduced into a reactor equipped with a stirring apparatus. 67 g of water, 5 g of glycerol, 2 g of cellosolve, 5 g of ethylene glycol, 1 g of 2-pyrrolidone, 0.1 g of cocobetaine, a surfactant, and 0.1 g of CA-650, an antifoaming agent, were added thereto in the order at room temperature and then stirred to give aqueous pigmented ink for ink-jet. The ink thus prepared was filtered through Whatman filter paper Nos. 1 and 4 to remove some insoluble components having a large particle size.

EXAMPLE 4

5 g of poly(acrylic acid-co-styrene) of formula (1) (Average Molecular Weight 30000) and 15 g of poly(styrene-co-maleic anhydride) of formula (2) (Average Molecular Weight 1900) were introduced into 165 g of water and well mixed. 8 g of potassium hydroxide was slowly added thereto and the resulting mixture was stirred for 1 hour at room temperature. This mixture was stirred for 5 hours at 100° C. to give a dispersant solution that is transparent and has some viscosity.

20 g of the dispersant solution, 10 g of carbon black for pigment, and 70 g of water were pulverized in a dinomill for 8 hours at 4500 rpm using 1 mm Zirconia bead to give mill-base having an average particle size of 92 nm.

20 g of the mill-base was introduced into a reactor equipped with a stirring apparatus. 67 g of water, 4 g of glycerol, 2 g of cellosolve, 5 g of ethylene glycol, 1 g of 2-pyrrolidone, 1 g of N-methylpyrrolidone, 0.1 g of cocobetaine, a surfactant, and 0.1 g of CA-650, an antifoaming agent, were added thereto in the order at room temperature and then stirred to give aqueous pigmented ink for ink-jet. The ink thus prepared was filtered through Whatman filter paper Nos. 1 and 4 to remove some insoluble components having a large particle size.

EXAMPLE 5

20 g of poly(acrylic acid-co-styrene) of formula (1) (Average Molecular Weight 60000), 9 g of poly(styrene-co-maleic anhydride) of formula (2) (Average Molecular Weight 1900), and 1 g of polyvinylpyrrolidone of formula (3) (Average Molecular Weight 5500) were introduced into 165 g of water and well mixed. 5 g of sodium hydroxide was slowly added thereto and the resulting mixture was stirred for 1 hour at room temperature. This mixture was stirred for 5 hours at 100° C. to give a dispersant solution that is transparent and has some viscosity.

20 g of the dispersant solution, 10 g of Pigment Red No. 122, and 70 g of water were pulverized in a dinomill for 8 hours at 4500 rpm using 1 mm Zirconia bead to give mill-base having an average particle size of 160 nm.

20 g of the mill-base was introduced into a reactor equipped with a stirring apparatus. 67 g of water, 4.5 g of glycerol, 2 g of cellosolve, 5 g of ethylene glycol, 1 g of 2-pyrrolidone, 0.5 g of cocobetaine, a surfactant, and 0.1 g of CA-650, an antifoaming agent, were added thereto in the order at room temperature and then stirred to give aqueous pigmented ink for ink-jet. The ink thus prepared was filtered through Whatman filter paper Nos. 1 and 4 to remove some insoluble components having a large particle size.

EXAMPLE 6

3 g of poly(acrylic acid-co-styrene) of formula (1) (Average Molecular Weight 50000), 16.5 g of poly(styrene-co-maleic anhydride) of formula (2) (Average Molecular Weight 1900), and 0.5 g of polyvinylpyrrolidone of formula (3) (Average Molecular Weight 5500) were introduced into 165 g of water and well mixed. 10 g of sodium hydroxide was slowly added thereto and the resulting mixture was stirred for 1 hour at room temperature. This mixture was stirred for 5 hours at 100° C. to give a dispersant solution that is transparent and has some viscosity.

20 g of the dispersant solution, 10 g of Pigment Blue No. 15:3, and 70 g of water were pulverized in a microfludizer (pressure: 20000 psi) fifteen times to give mill-base having an average particle size of 165 nm.

20 g of the mill-base was introduced into a reactor equipped with a stirring apparatus. 67 g of water, 5 g of glycerol, 2 g of cellosolve, 5 g of ethylene glycol, 1 g of 2-pyrrolidone, 0.1 g of cocobetaine, a surfactant, and 0.1 g of CA-650, an antifoaming agent, were added thereto in the order at room temperature and then stirred to give aqueous pigmented ink for ink-jet. The ink thus prepared was filtered through Whatman filter paper Nos. 1 and 4 to remove some insoluble components having a large particle size.

EXAMPLE 7

3 g of poly(acrylic acid-co-styrene) of formula (1) (Average Molecular Weight 50000), 16.5 g of poly(styrene-co-maleic anhydride) of formula (2) (Average Molecular Weight 1900), and 0.5 g of polyvinylpyrrolidone of formula (3) (Average Molecular Weight 5500) were introduced into 165 g of water and well mixed. 10 g of sodium hydroxide was slowly added thereto and the resulting mixture was stirred for 1 hour at room temperature. This mixture was stirred for 5 hours at 100° C. to give a dispersant solution that is transparent and has some viscosity.

20 g of the dispersant solution, 10 g of Pigment Yellow No. 79, and 70 g of water were pulverized in a microfludizer (pressure: 20000 psi) fifteen times to give mill-base having an average particle size of 180 nm.

20 g of the mill-base was introduced into a reactor equipped with a stirring apparatus. 67 g of water, 5 g of glycerol, 2 g of cellosolve, 5 g of ethylene glycol, 1 g of 2-pyrrolidone, 0.1 g of cocobetaine, a surfactant, and 0.1 g of CA-650, an antifoaming agent, were added thereto in the order at room temperature and then stirred to give aqueous pigmented ink for ink-jet. The ink thus prepared was filtered through Whatman filter paper Nos. 1 and 4 to remove some insoluble components having a large particle size.

EXAMPLE 8

7 g of poly(acrylic acid-co-styrene) of formula (1) (Average Molecular Weight 30000), 12.5 g of poly(styrene-co-maleic anhydride) of formula (2) (Average Molecular Weight 1900), and 0.5 g of polyvinylpyrrolidone of formula (3) (Average Molecular Weight 5500) were introduced into 165 g of water and well mixed. 10 g of sodium hydroxide was slowly added thereto and the resulting mixture was stirred for 1 hour at room temperature. This mixture was stirred for 5 hours at 100° C. to give a dispersant solution that is transparent and has some viscosity.

20 g of the dispersant solution, 10 g of carbon black for pigment, and 70 g of water were pulverized in a three roll mill four times to give mill-base having an average particle size of 92 nm.

20 g of the mill-base was introduced into a reactor equipped with a stirring apparatus. 67 g of water, 5 g of glycerol, 2 g of cellosolve, 5 g of ethylene glycol, 1 g of 2-pyrrolidone, 0.1 g of cocobetaine, a surfactant, and 0.1 g of CA-650, an antifoaming agent, were added thereto in the order at room temperature and then stirred to give aqueous pigmented ink for ink-jet. The ink thus prepared was filtered through Whatman filter paper Nos. 1 and 4 to remove some insoluble components having a large particle size.

INDUSTRIAL APPLICABILITY

The dispersant composition of the present invention as prepared above can be effectively used for preparing aqueous pigmented ink for ink-jet that provides long term fluidity at a fine injection nozzle of ink-jet, shows a stable injection amount, and gives no coagulation of pigment particles.

What is claimed is:

1. A dispersant composition which comprises a random-type polymer compound of the following formula (1):

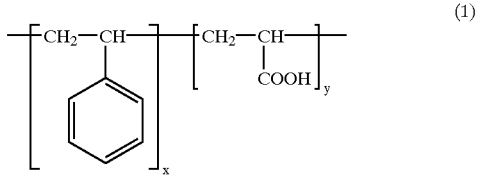

(1)

wherein x and y independently of one another are numbers making the average molecular weight of the compound of formula (1) a range of 1000 to 100000, and a random type polymer compound of the following formula (2):

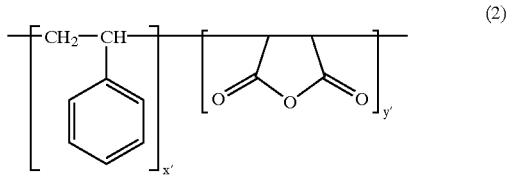

(2)

wherein x' and y' independently of one another are numbers making the average molecular weight of the compound of formula (2) a range of 1500 to 150000.

2. The composition of claim 1 which further comprises a polymer compound of the following formula (3):

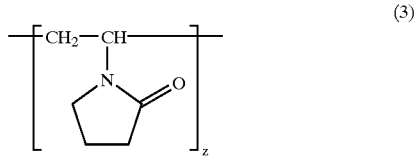

(3)

wherein z is a number making the average molecular weight of the compound of formula (3) a range of 5000 to 500000.

3. The composition of claim 1 or 2 which comprises 0.5 to 95% by weight of the random type polymer compound of formula (1), 5 to 99.5% by weight of the random type polymer compound of formula (2), and 0 to 50% by weight of the polymer compound of formula (3).

4. The composition of claim 3 which comprises 10 to 70% by weight of the random type polymer compound of formula (1), 15 to 85% by weight of the random type polymer compound of formula (2), and 0.5 to 20% by weight of the polymer compound of formula (3).

5. The composition of claim 1 wherein y or y' ranges from 0.1 to 3 when x or x' is 1.

6. The composition of claim 1 or 2 wherein the average molecular weight of the random type polymer compound of formula (1) is from 3000 to 50000, that of the random type polymer compound of formula (2) is from 3000 to 25000, and that of the polymer compound of formula (3) is from 10000 to 150000.

7. A dispersant composition which is obtained by heating the composition of claim 1 or 2 at 70 to 110° C. in the presence of a hydroxide for 1 to 24 hours.

8. The composition of claim 7 wherein the hydroxide is one or more selected from a group consisting of lithium hydroxide, sodium hydroxide, potassium hydroxide and ammonium hydroxide.

9. The composition of claim 8 wherein the hydroxide is used in an amount of 0.05 to 0.9 g when the total amount of the polymer compounds introduced is 1 g.

10. The composition of claim 7 which comprises one or more selected from a group consisting of the compounds of the following formulae (4), (5), and (6):

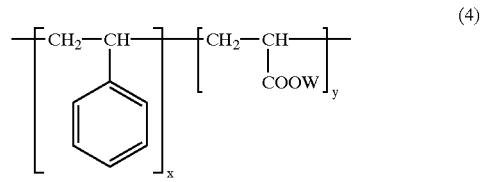

(4)

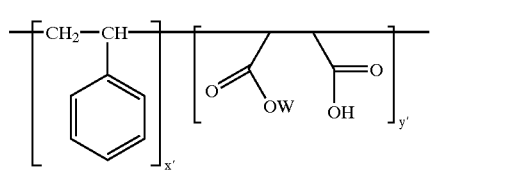

(5)

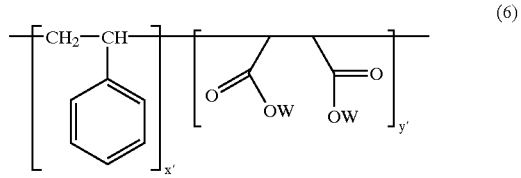

(6)

wherein x, y, x' and y' are defined as claim 1, and W represents Li, Na, K, or $NH_4$, in addition to the compounds of formulae (1) and (2) as defined in claim 1 and the compound of formula (3) as defined in claim 2.

* * * * *